(12) United States Patent
Li et al.

(10) Patent No.: US 11,973,338 B2
(45) Date of Patent: Apr. 30, 2024

(54) CHIP-LEVEL SOFTWARE AND HARDWARE COOPERATIVE RELAY PROTECTION DEVICE

(71) Applicant: DIGITAL GRID RES. INST., CHINA SOUTHERN PWR. GRID, Guangzhou (CN)

(72) Inventors: Peng Li, Guangzhou (CN); Wei Xi, Guangzhou (CN); Xiaobo Li, Guangzhou (CN); Hao Yao, Guangzhou (CN); Yang Yu, Guangzhou (CN); Tiantian Cai, Guangzhou (CN); Junjian Chen, Guangzhou (CN)

(73) Assignee: DIGITAL GRID RES. INST., CHINA SOUTHERN PWR. GRID, Guangzhou (CN)

( * ) Notice: Subject to any disclaimer, the term of this patent is extended or adjusted under 35 U.S.C. 154(b) by 0 days.

(21) Appl. No.: 18/278,237
(22) PCT Filed: Mar. 11, 2022
(86) PCT No.: PCT/CN2022/080258
§ 371 (c)(1),
(2) Date: Aug. 22, 2023
(87) PCT Pub. No.: WO2023/273404
PCT Pub. Date: Jan. 5, 2023

(65) Prior Publication Data
US 2024/0097433 A1    Mar. 21, 2024

(30) Foreign Application Priority Data
Jul. 1, 2021   (CN) .......................... 202110747236.1

(51) Int. Cl.
*H02H 7/00* (2006.01)
*H02H 1/00* (2006.01)
*H02H 7/26* (2006.01)

(52) U.S. Cl.
CPC .......... *H02H 7/262* (2013.01); *H02H 1/0092* (2013.01)

(58) Field of Classification Search
None
See application file for complete search history.

(56) References Cited

U.S. PATENT DOCUMENTS

| | | | |
|---|---|---|---|
| 2004/0263183 A1* | 12/2004 | Naidu ..................... | G01R 31/52 324/536 |
| 2006/0146919 A1* | 7/2006 | Strittmatter ............ | H02H 7/262 375/211 |
| 2013/0271877 A1* | 10/2013 | Novakovic ............ | H02H 7/262 361/20 |

FOREIGN PATENT DOCUMENTS

| | | |
|---|---|---|
| CN | 103066561 A | 4/2013 |
| CN | 104319878 A | 1/2015 |

(Continued)

OTHER PUBLICATIONS

International Search Report for corresponding Application No. PCT/CN2022/080258 dated May 13, 202, 6 pages.

(Continued)

*Primary Examiner* — Stephen W Jackson
(74) *Attorney, Agent, or Firm* — Seyfarth Shaw LLP

(57) ABSTRACT

A chip-level software and hardware cooperative relay protection device is provided. The device includes: a control chip, wherein a first control unit, a second control unit, and multiple logic circuits are integrated on the control chip; and the logic circuits perform microsecond-level rapid calculation on electrical signals of a protected electrical device, obtain fault feature parameters of the protected electrical device are and transmit same to the first control unit, then perform millisecond-level real-time protection logic determination according to the fault feature parameters of the protected electrical device to obtain relay protection results of the protected electrical device, and protect the protected electrical device by controlling an external relay according to the relay protection results. When the first control unit protects the protected electrical device, the second control unit performs second-level quasi-real-time management communication function processing on operation data generated by the first control unit and the logic circuits.

10 Claims, 5 Drawing Sheets

(56) References Cited

FOREIGN PATENT DOCUMENTS

| CN | 112182837 A | 1/2021 |
|---|---|---|
| CN | 112199323 A | 1/2021 |
| CN | 112260239 A | 1/2021 |
| CN | 112527404 A | 3/2021 |
| CN | 112540951 A | 3/2021 |
| CN | 112613691 A | 4/2021 |
| CN | 112671598 A | 4/2021 |
| CN | 113258546 A | 8/2021 |
| JP | 2004336830 A | 11/2004 |

OTHER PUBLICATIONS

Written Opinion for corresponding Application No. PCT/CN2022/080258 dated May 13, 202, 5 pages.
International Searching Authority document for corresponding Application No. PCT/CN2022/080258 dated May 13, 2022, 1 page.
Chinese Office Action for corresponding Application No. 202110747236.1 dated Aug. 20, 2021, 11 pages.

* cited by examiner

CHIP-LEVEL SOFTWARE AND HARDWARE COOPERATIVE RELAY PROTECTION DEVICE

CROSS REFERENCE TO RELATED APPLICATIONS

This is a U.S. National Stage application of, and claims priority to, PCT/CN2022/080258, filed Mar. 11, 2022, which further claims priority to Chinese Patent Application No. 202110747236.1, filed Jul. 1, 2021, the disclosures of which are incorporated herein by reference in their entirety.

TECHNICAL FIELD

The present disclosure relates to the technical field of relay protection for power systems, and in particular, to a chip-level software and hardware cooperative relay protection device.

BACKGROUND

Power system relay protection is the first line of defense for the safe and stable operation of the power grid. The energy flow and information flow are highly integrated in the smart grid, the digitalization and networking characteristics of the power grid are becoming more and more obvious, the huge amount of concurrent real-time data is proliferating, meanwhile, with the rapid development of new energy and DC transmission, the power electronics technology is widely used, the power system equipment base is changing from traditional AC equipment to power electronics, the operating characteristics and mechanism of the new power system are changing profoundly. The power electronics characteristics of the power grid require faster and more reliable fault clearance, the real-time control of the power grid operation mode is more accurate, so the relay protection technology is facing new challenges.

Traditional microcomputer relay protection device adopts the design concept of multi-board multi-CPU chip cooperation, which adapts to the development of the new situation of the power grid by constantly increasing the corresponding functional boards and modules. Building-block type stacking of boards causes the device to become more and more complex, facing many problems such as decentralization of board functions, too many data interactions, degradation of reliability and overall performance.

SUMMARY

In view of this, it is necessary to provide implementation manner of a relay protection device based on chip-level software and hardware cooperative architecture for the above technical problems.

A chip-level software and hardware cooperative relay protection device is provided. The device includes a control chip. A first control unit, a second control unit, and multiple logic circuits are integrated on the control chip.

In an embodiment, the second control unit is specifically configured to synchronously perform multiple data processing tasks with second-level computing power, and the data processing tasks include at least two of: data recording, data displaying, data printing, data sending, and other management communication functions.

In an embodiment, the first control unit is configured to, when a relay protection result for the to-be-protected electrical device indicates a fault of the to-be-protected device, control an external relay to clear the fault to achieve relay protection.

In an embodiment, every two among the logic circuits, the first control unit and the second control unit are connected to each other via a high-speed data channel.

In an embodiment, the chip-level software and hardware cooperative relay protection device further includes a reset and monitoring hardware;

the reset and monitoring hardware is configured to monitor an operation status of the first control unit and perform a reset process on the first control unit when the operation status of the first control unit is abnormal.

In an embodiment, the second control unit further includes a first timing register, the logic circuit further includes a second timing register, and the chip-level software and hardware cooperative relay protection device further includes a secondary reset hardware;

the first control unit is configured to: monitor a count value of the first timing register and a count value of the second timing register; and control the secondary reset hardware to reset the second control unit when the count value of the first timing register stops updating, and/or control the secondary reset hardware to reset the logic circuit when the count value of the second timing register stops updating.

In an embodiment, the second control unit is further configured to: obtain logic circuit configuration information, the logic circuit configuration information including an identification of a target logic circuit, and store the logic circuit configuration information in a shared cache of the control chip; where the target logic circuit includes at least two circuits of the multiple logic circuits;

the first control unit is further configured to: obtain the logic circuit configuration information from the shared cache, and combine a target combination circuit according to the identification of the target logic circuit; where the target combination circuit includes the target logic circuit;

the first control unit is configured to: transmit the electrical signal of the to-be-protected electrical device to the target combination circuit, enable the target combination circuit to obtain the fault characteristic parameter of the to-be-protected electrical device based on the electrical signal and transmit the fault characteristic parameter to the first control unit.

In an embodiment, the logic circuits in the target combination circuit process the electrical signal of the to-be-protected electrical device in parallel.

In an embodiment, the first control unit is configured to determine the target logic circuit in the target combination circuit and transmit the electrical signal of the to-be-protected electrical device to the target logic circuit for fast operation processing to obtain intermediate parameter data; and the first control unit is further configured to determine a next target logic circuit in the target combination circuit based on the intermediate parameter data, and transmit the intermediate parametric data to the next target logic circuit for fast operation processing until data after the fast operation processing by the next target logic circuit is the fault characteristic parameter and the fault characteristic parameter is transmitted to the first control unit.

In an embodiment, the first control unit is configured to determine the relay protection result for the to-be-protected electrical device based on a preset electrical parameter of the to-be-protected electrical device and the fault characteristic parameter, and protect the electrical device according to the relay protection result; or the first control unit is configured to perform a calculation on the fault characteristic parameter, transmit a calculation result to the target logic circuit in the target combination circuit, determine the relay protection result for the to-be-protected electrical device, and protect the electrical device according to the relay protection result.

According to the above embodiments, since the chip-level hardware and software cooperative relay protection device includes: a control chip; the control chip has a first control unit, a second control unit and a plurality of logic circuits integrated on the control chip; the logic circuits perform microsecond-level fast computing processing on the electrical signals of the protected electrical equipment to obtain the fault characteristics of the protected electrical equipment and transmit them to the first The first control unit makes millisecond real-time protection logic judgments based on the fault characteristic parameters of the protected electrical equipment, obtains relay protection results of the protected electrical equipment, and controls external relays to protect the protected electrical equipment based on the relay protection results; the second control unit, when the first control unit protects the protected electrical equipment, manages the operation data generated by the first control unit and the logic circuits in quasi-real time at the second level. The second control unit will process the operation data generated by the first control unit and logic circuit when the first control unit protects the protected electrical equipment. The second control unit is capable of processing the front-end data processing part of the relay protection task, which was originally completed by the software program, through the logic circuit with microsecond-level arithmetic power, reducing the discrete delay between each functional module and weakening the processor load, realizing fast processing of the relay protection function, and obtaining the relay protection result. Therefore, the hardware-software synergistic technology architecture satisfies the requirement for fast start-up of local protection functions while taking advantage of the rich data services provided by the operating system. The chip-level software-hardware synergistic relay protection device realizes the overall protection function based on a single chip, replaces multi-functional boards with multiple control units within the control chip, replaces bus communication between multiple boards with high-speed data transmission channels and shared memory within the chip, replaces software algorithms with hardware logic circuits, and replaces serially executed CPU software processing with multi-channel parallel processing circuits to improve data processing efficiency and reduce CPU This improves data processing efficiency and reduces CPU load, thus realizing real-time acquisition and processing of massive and concurrent data and improving device integration and speed.

DETAILED DESCRIPTION OF THE EMBODIMENTS

Figure 1:
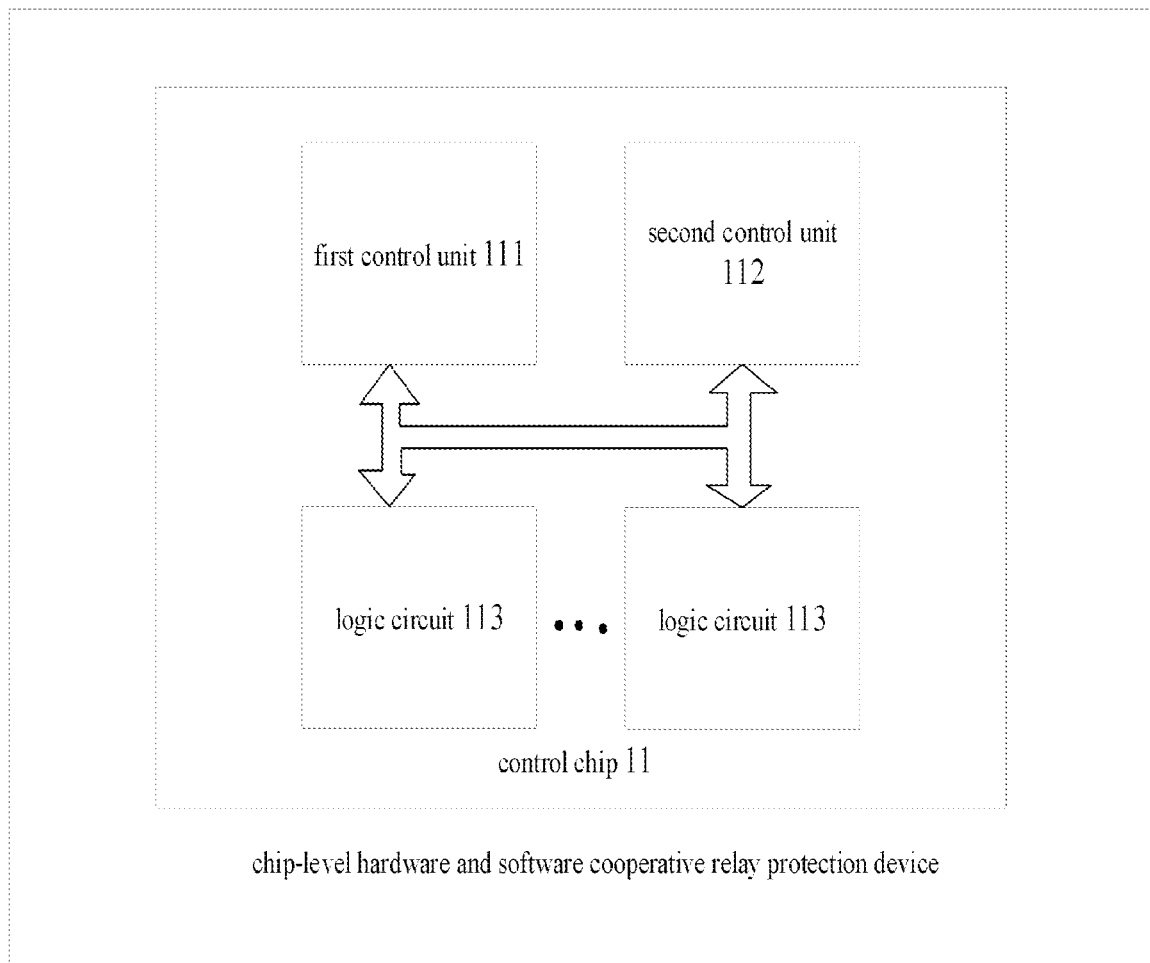
FIG. 1 is a structural diagram of a chip-level software and hardware cooperative relay protection device according to an embodiment.

In order to further clarify objectives, technical solutions and advantages of the present disclosure, detailed description about the present application is given hereinafter based on embodiments in conjunction with the drawings.

In the specification, sequence numbers listed for components, such as "first" and "second", are merely used to distinguish described objects, without indicating any sequence or any technical definition. Terms "connected" and "coupled" cited in the present disclosure, in case of no particular explanation, both include direct and indirect manners of connection and coupling.

Relay protection technology is an integral part of the power system and the most basic, important and effective technical means to guarantee the safety of power terminals and to prevent or limit large-area power outage in the power system. Currently, relevant power regulations stipulate that no electrical equipment (lines, bus-bars, electric generators, transformers, etc.) is allowed to operate in a state without relay protection. Therefore, all primary equipment in the power system must be installed with relay protection devices. Early relay protection device is built with numerous discrete electromechanical relays and physical analog circuits, such relay protection device is slow, large, highly power-consumed, having single function and complex maintenance, and has limitations in efficiency, performance and energy efficiency. With the development of electronic computer technology, especially the application of microcomputers and microprocessors, the existing relay protection device analyzes and calculates the fault-determination electrical quantity of the power system through computer software algorithms, and then controls the on-off of a circuit breaker. With a large number of distributed power supplies, DC transmission, electric vehicles and other open access to the power system, a new deep low-carbon power system, led by power electronics, is gradually generated, and the existing microcomputer relay protection device, designed on the concept of multi-board multi-CPU cooperation, adapts to new development trend of the power grid by constantly increasing corresponding functional boards and modules, thereby facing many problems such as decentralization of board functions, too many data interactions, degradation of reliability and overall performance. The protection algorithm is limited by the instruction cycle and speed of CPU, as well as the characteristics of serial processing and sequential execution of software, which result in lengthy chain, time-consuming processing and low efficiency in execution; consequently, it is difficult to meet the requirements of microsecond-level fast calculation, millisecond-level real-time protection and second-level quasi-real-time management on the protection device under massive concurrent real-time data. To address the problems of existing relay protection devices, the present disclosure provides a chip-level relay protection device.

A chip-level software and hardware cooperative relay protection device is provided according to en embodiment, a structural block diagram of which is shown in FIG. 1. As shown in FIG. 1, the chip-level software and hardware cooperative relay protection device includes a control chip 11; a first control unit 111, a second control unit 112, and multiple logic circuits 113 are integrated on the control chip 11.

The logic circuit is adapted to perform a microsecond-level fast calculation on an electrical signal of a to-be-protected electrical device, obtain a fault characteristic parameter of the to-be-protected electrical device, and transmit the fault characteristic parameter to the first control unit.

The first control unit is adapted to perform a millisecond-level real-time protection logical judgement based on the fault characteristic parameter of the to-be-protected electrical device, obtain a relay protection result for the to-be-protected electrical device, and control an external relay to protect the to-be-protected electrical device based on the relay protection result.

The second control unit is adapted to, when the first control unit protects the to-be-protected electrical device, perform a second-level quasi-real-time management communication function processing on operation data generated by the first control unit and the logic circuits.

The first control unit and the second control unit may be implemented using Microcontroller Unit (MCU) chips or Digital Signal Processing (DSP) chips, which is not limited herein. Both the first control unit and the second control unit may include dual-core, quad-core, and octa-core structures, which is not restricted here. The logic circuit is a hardware integrated circuit with a logic algorithm, such as sampling value processing circuit, electrical parameter calculation circuit, protection logic circuit, signal acquisition circuit, time management circuit, which may be set according to the actual needs of the user and is not limited here. The control chip may be one chip having two control units and multiple logic algorithm circuits. The first control unit and the second control unit may run the same system or different systems, which is not limited herein, and the system run by the first control unit and the second control unit may be bare running program (e.g., BM software) and operating system software, which is not limited herein. The to-be-protected electrical device is an electrical device on which a relay protection detection is to be performed.

Specifically, the first control unit may be used as a main core on which different relay protection programs may be run to cope with relay protection scenarios for lines, bus-bars, electric generators, transformers, etc. to achieve different relay protection. The relay protection program is run to realize protection logic operation, which may mainly contain real-time application modules such as GOOSE parsing, protection algorithm, GOOSE open-in, trip logic, GOOSE open-out, and custom management. To achieve real-time control and communication application management of the protection device through two control units within a single chip, it focuses on developing two heterogeneous systems within the single chip to respectively meet the requirement of high real-time protection calculation and the requirement of multiple network services of human-machine interface. High real-time tasks such as protection calculation and SV/GOOSE message processing are arranged on the first control unit, and task scheduling time granularity can reach 100 us level.

The logic circuit may perform front-end data processing such as Gigabit Ethernet, SV decoding, storm suppression, low-pass filtering, message distribution, interpolation and synchronization on electrical signals of accessed lines, bus-bars, generators, transformers and other to-be-protected devices. Accessed electrical signals are digital signals converted from analog signals of electrical quantities such as voltage and current of the to-be-protected device by an analog-to-digital conversion module.

Tasks such as human-machine interface, wave recording, communication management may be arranged in the second control unit. The second control unit mainly achieves device management and device communication, mainly including MMS messaging, wave recording, communication management and other management communication applications.

When the first control unit runs one relay protection program, when it runs to the logic operation node, electrical signals of the accessed to-be-protected electrical device nay be allocated to multiple logic circuits with different algorithm functions to perform relevant fast operation processings in parallel, for example, data processings such as SV decoding, storm suppression, low-pass filtering, message distribution, interpolation synchronization, etc. may be performed on the electrical signals to extract a fault characteristic parameter of the to-be-protected electrical device. The fault characteristic parameter is transmitted to the first control unit. The first control unit performs millisecond-level real-time protection logical judgement on the fault characteristic parameter, obtains a relay protection result for the to-be-protected electrical device, and controls an external relay to protect the to-be-protected electrical device according to the relay protection result. When the first control unit indicates the relay to conduct a relay protection action, the second control unit may record, based on instructions given by an operation manager in advance, data information generated during the operation of the first control unit and the logic circuits, and display the data information or print the data information or send the data information to an external terminal, which is not limited herein.

In the embodiment, the chip-level hardware and software cooperative relay protection device includes: a control chip; the control chip integrates a first control unit, a second control unit and multiple logic circuits; the logic circuits perform microsecond-level fast operation processing on the electrical signals of the to-be-protected electrical device to obtain the fault characteristic parameter of the to-be-protected electrical device and transmit the fault characteristic parameter to the first control unit; the first control unit performs millisecond-level real-time protection logic judgment based on the fault characteristic parameter of the to-be-protected electrical device, obtains a relay protection result for the to-be-protected electrical device, and controls an external relay to protect the to-be-protected electrical device based on the relay protection result; the second control unit, when the first control unit protects the to-be-protected electrical device, performs second-level quasi-real-time management communication function processing on the operating data generated by the first control unit and the logic circuits. It is able to process a part of relevant content of the front-end data processing of the relay protection task, which was originally completed by the software program, through the logic circuit with microsecond-level computing power, reducing the discrete delay in cooperation between functional modules and weakening the processor load, realizing fast processing of the relay protection function, and obtaining the relay protection result. At the same time, the second control unit is equipped with simultaneous multitasking for communication and management recording. Therefore, the hardware-software cooperative technical architecture satisfies the requirement for fast start-up of local protection functions while taking advantage of the rich data services provided by the operating system. The chip-level software-hardware cooperative relay protection device realizes the overall protection function based on a single chip, replaces multi-functional boards with multiple control units within the control chip, replaces bus communication between multiple boards with high-speed data transmission channels and shared cache within the chip, replaces software algorithms with hardware logic circuits, and replaces serially executed CPU software processing with multi-channel parallel processing circuits, to improve data processing efficiency and reduce CPU load, thus realizing real-time acquisition and processing of massive and concurrent data, and improving device integration and speediness.

The above embodiment illustrates the chip-level hardware and software cooperative relay protection device, and the function of the second control unit is further illustrated in an embodiment. In the embodiment, the second control unit is specifically adapted to synchronously perform multiple data processing tasks with second-level computing power. The data processing tasks may include at least two of: data recording, data displaying, data printing, data sending, and other management communication functions.

Specifically, the second control unit may perform multiple data processing tasks synchronously with second-level computing power. The data processing tasks include: data recording, data display, data printing and data sending and other data processing tasks with management communication functions. The second control unit, upon receiving user instruction, may synchronously perform two tasks of data recording and data displaying, or three tasks of data recording, data displaying and data printing, or four tasks of data recording, data displaying, data printing and data sending, which is not limited herein.

In the embodiment, the second control unit is specifically used to synchronously perform multiple data processing tasks with second-level computing power; consequently, it is able to shorten time consumed in data logging, and to achieve synchronous execution of at least two of management communication functions such as data recording, data displaying, data printing and data sending, i.e., achieve synchronous execution of multiple tasks.

The function of the second control unit is described in the above-mentioned embodiment, where the function of the first control unit is further described in an embodiment hereinafter. In an embodiment, the first control unit is specifically adapted to, when a relay protection result for the to-be-protected electrical device indicates a fault of the to-be-protected device, control an external relay to clear the fault to achieve relay protection.

Specifically, when the first control unit determines that the relay protection result for the to-be-protected electrical device indicates a fault of the protected device, the first control unit controls the external relay to clear the fault to achieve relay protection on the to-be-protected electrical device.

Optionally, if the relay protection result for the to-be-protected electrical device indicates that the to-be-protected device is normal, the relay protection result for the to-be-protected electrical device may be transmitted to the second control unit for display, or the second control unit may send the relay protection result for the to-be-protected electrical device to an external terminal.

In the embodiment, the first control unit may, after confirming the relay protection result for the to-be-protected electrical device, issue a real-time instruction to control the external relay to clear the fault when the relay protection result indicates the fault, thereby achieving relay protection and ensuring the safety of the to-be-protected electrical device.

The above-mentioned embodiment explains how the first control unit provides relay protection for the to-be-protected electrical device, and a connection relationship among the first control unit, the second control unit and the logic circuits is explained in an embodiment hereinafter. In an embodiment, every two among the logic algorithm circuit, the first control unit, and the second control unit are connected to each other via a high-speed data channel.

The high-speed data channel may be a channel via which high-speed data transmission can be performed, and may include different buses such as AXI high-performance bus, which is not limited herein.

Specifically, the first control unit and the second control unit may be connected via a high-speed data channel and may perform data interaction in a manner of cache sharing, and the first control unit and the logic circuit may be connected to each other by a bus. The asymmetric structure of multiple control units used in the chip-based protection realizes the function of the whole protection device. The two control units and the logic circuit have to ensure operational independence, but there are large-capacity and high-frequency data interactions between each other, for example, the two control units may transmit to each other configuration information, status information, wave recording data, commands, etc., and the logic circuit and the two control units need to transmit to each other configuration information, sampling value transmission, Ethernet message sending and receiving, etc.

Further, the chip-level hardware and software cooperative relay protection device divides the data to be transmitted among the two control units and the logic circuit into two categories based on the characteristics of various information flows: stream data and password data, which use different data interaction mechanisms respectively.

Stream data is normal service throughput data, uniformly in the form of descriptive information+data packet. It contains all flows of information during normal operation, such as Ethernet messages, sample values, wave recording. To implement, packets may be written to cache in way of DMA, and description information of the packets may be written to cache at the same time. The data receiver is notified in way of updating a write pointer of a queue of the description information of the packets, and the data receiver identifies whether this pointer is updated by interrupt or query, calculates a difference between a read pointer and the write pointer, obtains information on the number of packets to be processed, and then enters data processing process. For example, packet description information is first read, and then a corresponding packet is processed or not according to described packet attributes. During the whole process, the data receiver does not need to care about when data is input or manage the writing of data to cache, but only needs to identify new data and process it according to the change of the pointer, which greatly improves the efficiency of the control unit. The decoupling of data processing and data transmission also simplifies system complexity and increases transmission reliability accordingly. In addition, unlike the common practice of processor-initiated DMA in embedded software, the device uses the logic circuit as a DMA controller for all data transmissions from the logic circuit to the control unit; further, definition of structure of stream data solves the problem of DMA transmission length variation and can be used flexibly.

Password data is used for configuration, command and other information piece interactions with clear predefinition, less interaction and simple content. Specific address space and content definition can be predefined between cores, and it is only needed to write to-be-transferred information to a register at a specific address, or read information from the register. This operation is advantageous for simplicity and convenience.

In the embodiment, the logic circuit and the two control units may be connected with a high-speed data channel to achieve data interaction, which can ensure efficient and convenient data interaction, but also meet the safety and reliability of data transmission. The high-speed data channel has efficient, unified and scalable functions, which can ensure the efficiency, stability and robustness of multi-core cooperative work.

Figure 2:
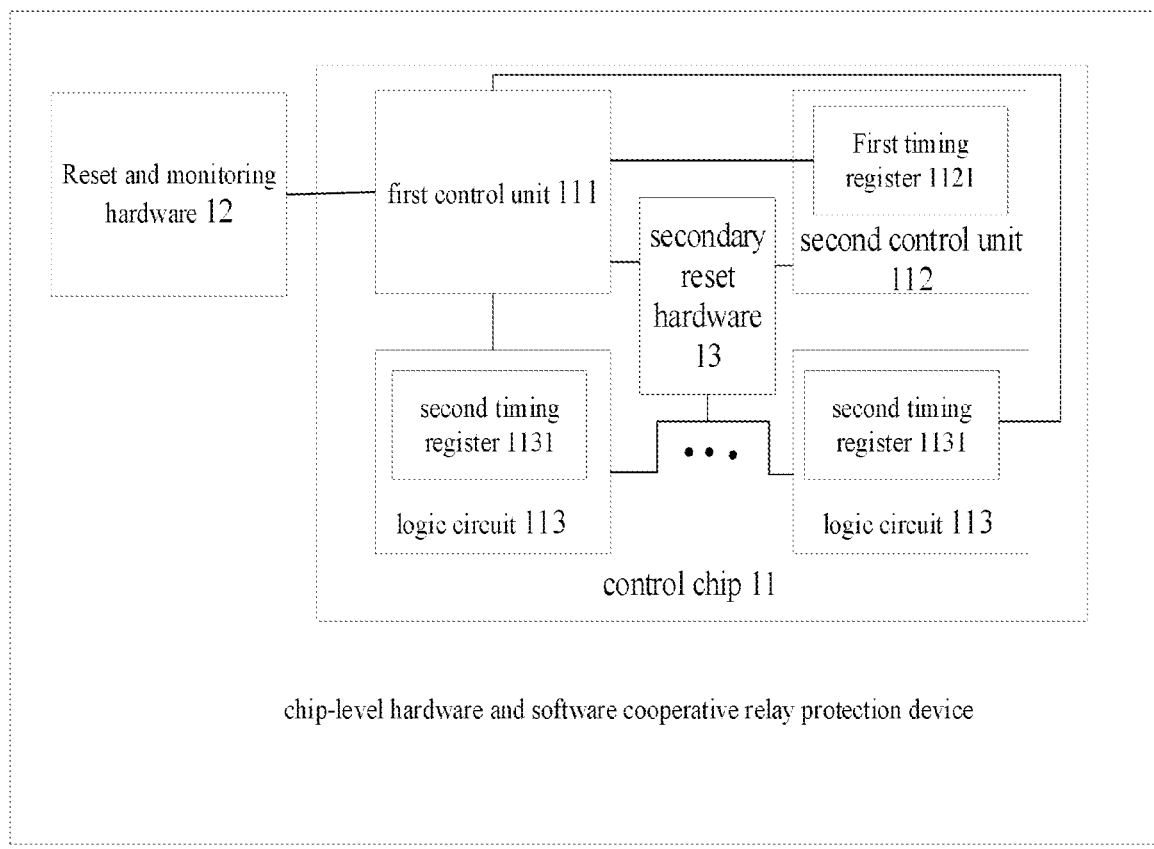
FIG. 2 is a structural diagram of a chip-level software and hardware cooperative relay protection device having a reset and monitoring hardware according to an embodiment.

The above embodiment illustrates the data interaction mechanism among the first control unit, the second control unit and the logic circuit. During the operation of the chip-level hardware and software cooperative relay protection device, each module may be monitored and quickly reset in case of abnormality, thereby ensuring normal operation of the relay protection device. It is explained with an embodiment hereinafter. In an embodiment, as shown in FIG. 2, the chip-level hardware and software cooperative relay protection device further includes a reset and monitoring hardware 12.

The reset and monitoring hardware 12 is adapted to monitor an operation status of the first control unit and perform a reset process on the first control unit when the operation status of the first control unit is abnormal.

Figure 3:
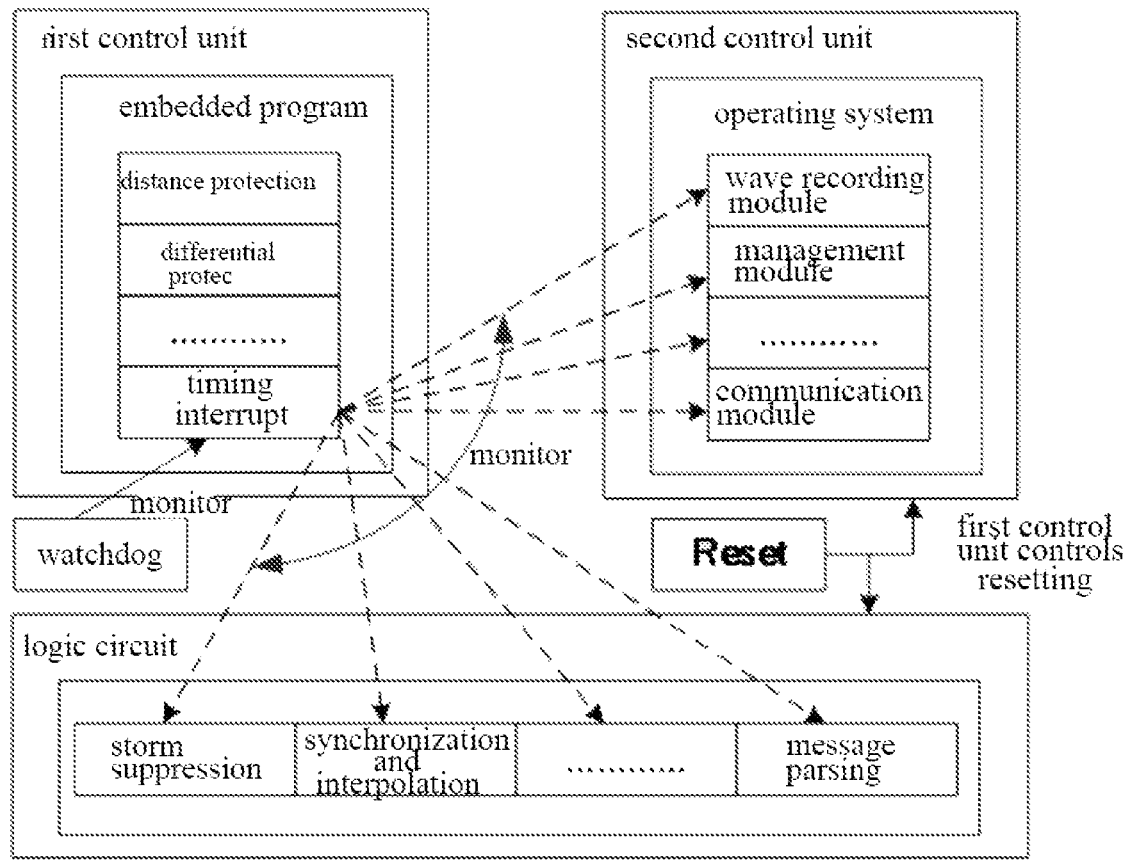
FIG. 3 is a schematic diagram of a hardware reset system of a chip-level software and hardware cooperative relay protection device according to an embodiment.

Specifically, the reset and monitoring hardware may include a hardware watchdog. The reset process may be a power-off and reboot, or a reset and reload program, which is not limited herein. FIG. 3 is a schematic diagram of a chip hardware and software reset system. An external hardware watchdog with a reset cycle of 1.6s is connected to the first control unit. When the first control unit works abnormally, the reset and monitoring hardware may reset the first control unit within 1.6s to reload the program.

Further, the second control unit 112 includes a first timing register 1121, the logic circuit 113 includes a second timing register 1131, the chip-level software and hardware cooperative relay protection device also includes a secondary reset hardware 13.

The first control unit 111 is adapted to: monitor a count value of the first timing register 1121 and a count value of the second timing register 1131; and control the secondary reset hardware 13 to reset the second control unit 112 when the count value of the first timing register 1121 stops updating, and/or control the secondary reset hardware 13 to reset the logic circuit 113 when the count value of the second timing register 1131 stops updating.

Specifically, the chip-level hardware and software collaborative relay protection device manages a multi-control-unit reset system using one master (i.e., the first control unit) and two slaves (i.e., the second control unit and the logic circuit), with the first control unit holding the highest authority to supervise and control the second control unit and the logic circuit.

When the second control unit is running a program, the first timing register may count according to a mechanism of adding 1 per second. When the second control unit is running abnormally, the first timing register does not count and stops updating. When the logic circuit is running a program, the second timing register may count according to a mechanism of adding 1 per second. When the logic circuit is running abnormally, the second timing register does not count and stops updating. The first control unit may monitor counting situations of the first and second timing registers in real time, and when the timing register is not refreshed within 1 s, the first control unit may enable, through the secondary reset hardware, the second control unit to reset independently and re-execute from program entry. When finding that the timing register is not updated, the first control unit may cause, through the secondary reset hardware, the logic circuit to reset or even reload.

Optionally, states of respective tasks are further monitored within the first control unit and the second control unit. In the first control unit, a timer interrupt with a highest priority is used to monitor each task module, such as a protection algorithm module. Every time the protection algorithm module executes, a status variable adds 1. The software watchdog module may monitor the status variable in real time; when the status variable does not change within 1s, it is considered a software failure, and the first control unit may carry out a software restart. Such a safety mechanism may ensure that all tasks of the control units are run reliably.

Optionally, the first control unit monitors and manages a status of the logic circuit through service data streams transmitted by the logic circuit. For example, an SV data stream is transmitted to the first control unit, then the first control unit manages and monitors abnormal information of the SV data stream. Through whole-course monitoring based on data streams, the first control unit may promptly discover and analyze abnormalities in the processing of the logic circuit, avoiding problems such as abnormalities cannot be monitored and fault alarms are delayed caused by black box operation of the logic circuit, and system crashes resulted due to these problems.

Optionally, the logic circuit may identify and count abnormalities in business flows at entry and exit locations of each key processing module, and hand abnormal statistics to the first control unit. The first control unit may identify problem points based on comparison of these abnormal statistics, and give alarm information timely. A processing flow may include: after the logic circuit receives a message, the logic circuit determines whether an Ethernet message is abnormal; for SV and GOOSE message types, the logic circuit determines whether SV and GOOSE messages do not comply with the 61850 specification (such as MAC address abnormality); for an identified subscription message, at the end of each packet, checksum calculation is performed on each packet of data to determine whether the packet is complete; for a message sent by the first control unit, frame counter check and CRC are performed at each processing step, and it is further checked whether overflow errors take place in caches of respective levels. All abnormalities found are counted and sent up. The first control unit analyzes whether abnormalities in each link of the entire data stream conform to a logical relationship based on received abnormality statistics recording data, and can accurately locate locations where the abnormalities occur.

In the embodiment, the chip-level hardware and software cooperative relay protection device further includes: a reset and monitoring hardware, the reset and monitoring hardware monitors the operation state of the first control unit, and resets the first control unit when the operation state of the first control unit is abnormal, while the second control unit further includes: a first timing register; the logic circuit further includes a second timing register; the chip-level hardware and software cooperative relay protection device also includes a secondary reset hardware. The first control unit monitors the count value of the first timing register and the count value of the second timing register, and controls the secondary reset hardware to reset the second control unit when the count value of the first timing register stops updating, and/or, controls the secondary reset hardware to reset the logic circuit when the count value of the second timing register stops updating. Abnormality of final relay protection result due to module operation abnormalities is prevented, and the safety of each module operation is increased. By monitoring safety of the logic circuit in the entire data processing process, the fault tolerance capability of the overall software architecture is improved and the safety of data processing inside the chip is ensured. Loss of frames and wrong frames in data transmission process can be reduced to the maximum extent, and at the same time problems and hidden dangers (such as failure or abnormality of a certain connection device) may be found, and alarms can be made in time, thus enhancing safety and reliability of interface to the maximum extent and avoiding the escalation of fault.

The above embodiment illustrates the chip-level hardware and software cooperative relay protection device. Before relay protection is carried out, it is also necessary to configure relevant relay protection program and combination of logic circuits, which is now described in an embodiment. In an embodiment, the second control unit is also used to: obtain logic circuit configuration information, the logic circuit configuration information including an identification of a target logic circuit, and store the logic circuit configuration information into a shared cache of the control chip. The target logic circuit is at least two circuits of multiple logic circuits.

The first control unit is also adapted to obtain the logic circuit configuration information from the shared cache, combine a target combination circuit according to the identification of the target logic circuit; the target combination circuit includes the target logic circuit.

The first control unit is adapted to transmit electrical signals of the to-be-protected electrical device to the target combination circuit, causing the target combination circuit to obtain a fault characteristic parameter of the to-be-protected electrical device based on the electrical signals and transmit the fault characteristic parameter to the first control unit.

The logic circuit configuration information is a configuration instruction transmitted by a user through the second control unit, which may include the identification of the target logic circuit, and an input/output identification of the target logic circuit.

Specifically, after the user issues the logic circuit configuration information, the logic configuration information may be stored in the shared cache of the control chip through the second control unit, and the first control unit may obtain the configuration information from the shared cache and combine the target combination circuit. It is set that when a program run by the first control unit reaches a logic operation node, the electrical signals of the to-be-protected electrical device are input to multiple target logic circuits in the target combination circuit to perform logic operations of different functions, and the fault characteristic parameter of the to-be-protected electrical device is extracted through the target logic circuits and transmitted to the first control unit.

Optionally, the logic circuits in the target combination circuit process the electrical signals of the to-be-protected electrical device in parallel. Since the hardware circuit is set up without sequential execution of the software program, it is able to process multiple pieces of data simultaneously in parallel to achieve different data functions.

Figure 4:
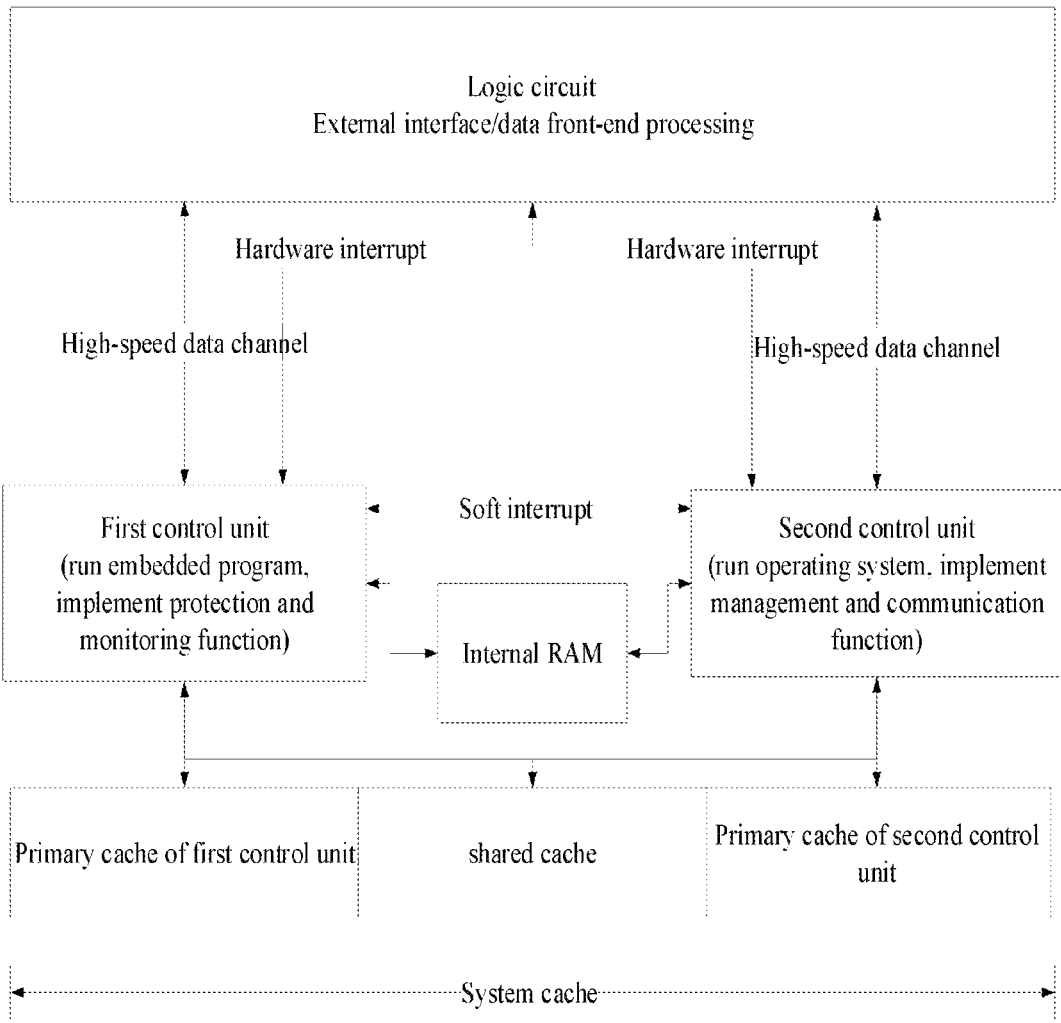
FIG. 4 is a block diagram of a software architecture of an asymmetric heterogeneous system of a chip-level hardware and software cooperative relay protection device according to an embodiment.

To ensure efficient work, as shown in FIG. 4, the first control unit and the second control unit may both have respective L1 caches and share an L2 cache, to ensure high performance requirements of the chip-based protection device. Specific areas of L2 cache are respectively allocated to the two control units to ensure that they do not affect each other. The two control units are interconnected through a high-speed data channel. The first control unit configures the high-speed data channel. The configured high-speed data channel may maintain the consistency of the cache, so high-speed data sharing can be achieved without special operations on the cache. Such architecture ensures high-speed data sharing between the first control unit and the second control unit, which can effectively reduce the burden of maintaining cache consistency and meet the high-performance requirements of the chip-based protection device.

Before the relay protection program runs, the first control unit first needs to delineate resource boundaries for the two control units and the logic circuits, the most important of which is cache space delineation. The first control unit needs to define contents of three cache allocations for each control unit: on-chip cache address definition, off-chip cache address definition, and inter-chip shared cache address. The cache definition also includes MMU management, and which addresses need to be locked in CACHE also needs to be defined in an initialization phase.

Figure 5:
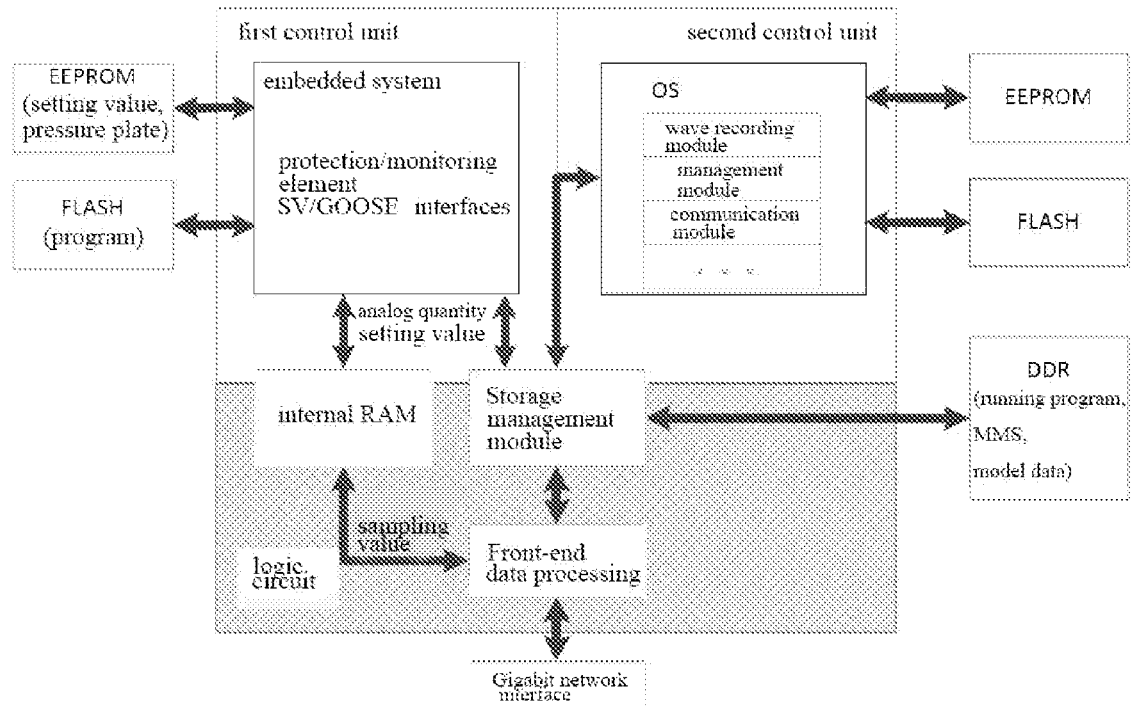
FIG. 5 is a core architecture of a chip-level hardware and software cooperative relay protection device according to an embodiment.

Peripheral shared modules can also be included in the chip-level software and hardware cooperative relay protection device. The peripheral shared modules that come with the control units are all managed by the first control unit, and the connection relationship can be referred to FIG. 5, including serial port, CAN, Flash, DDR, EEPROM interface, etc. The peripheral shared modules instantiated in the logic circuit are pre-set according to engineering requirements. The functions shared by the two control units are prioritized to be managed by the first control unit. The first control unit may use all Ethernets, so the networks are all managed and configured by the first control unit, including filtering, screening and message priority definition.

Figure 6:
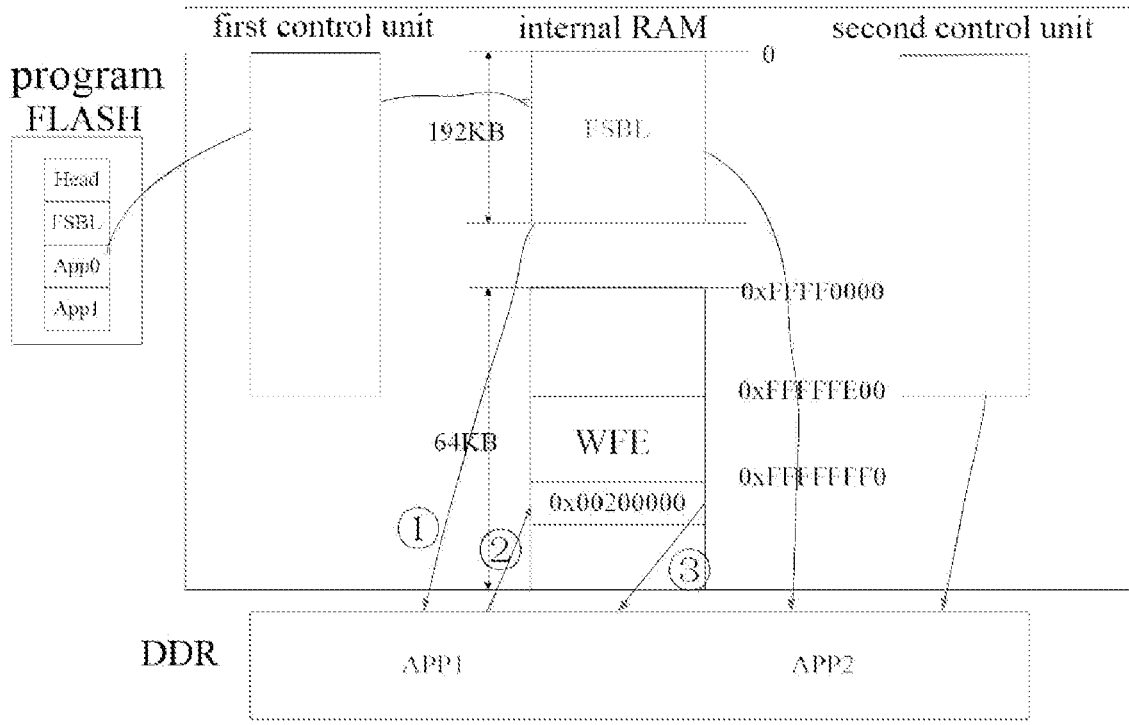
FIG. 6 is a schematic diagram of start-up processes of master and slave control units of a chip-level hardware and software cooperative relay protection device according to an embodiment.

Optionally, as shown in FIG. 6, after the device is powered on and started, the chip-level software and hardware cooperative relay protection device is initialized, and loads and runs the program. The first control unit may execute a chip-cured Boot ROM program first, then load FSBL (a first boot program). FSBL may cause the second control unit enter a WFE state (wait state), then FSBL may load program APP1 of the first control unit and program APP2 of the second control unit into an external DDR memory respectively. The second control unit is still in the WFE state, the first control unit runs the APP1 program, writes APP2 program address 0x00200000 to internal RAM address 0xffffff0, and sends a signal to the second control unit. The second control unit receives the signal, reads 0xffff0 and obtains 0x00200000, the program will be called to 0x00200000 for execution, and the second control unit runs normal business logic.

Optionally, the first control unit may automatically load the program into the external DDR memory after the device is powered on, and then the first control unit starts first and reads data from the shared cache, where the second control unit may put a current zone setting value and soft platen data sent by the user into the internal RAM. An analog sampling value, i.e., the electrical signal of the to-be-protected electrical device, which is generated by an external MU device, is given to the internal logic circuit through a Gigabit network interface, and is stored directly into the internal RAM after processings such as message distribution, SV decoding, low-pass filtering, and interpolation and synchronization by the logic circuit. The first control unit obtains sampling value data from the internal RAM for logic operation in a secondary cache.

In the embodiment, the second control unit obtains the logic circuit configuration information and stores the logic configuration information into the shared cache of the control chip; the first control unit obtains the logic circuit configuration information from the shared cache and combines the target combination circuit according to the identification of the target logic circuit; the target combination circuit includes the target logic circuit. The first control unit transmits the electrical signal of the to-be-protected electrical device to the target combination circuit, so that the target combination circuit obtains the fault characteristic parameter of the to-be-protected electrical device based on the electrical signal and transmits the fault characteristic parameter to the first control unit. With the identification logic circuit configuration information of the target logic circuit including at least two circuits transmitted by the second control unit, it is possible to combine the logic circuits for performing different relay protection tasks and combine the target combination circuit to provide a basis for performing subsequent relay protection.

The above embodiment illustrates initialization configuration of the relay protection device, and the hardware and software data interaction in the relay protection device is illustrated in an embodiment hereinafter. In an embodiment, the first control unit is used to determine a target logic circuit in the target combination circuit and transmit the electrical signal of the to-be-protected electrical device to the target logic circuit for fast operation processing to obtain intermediate parameter data.

The first control unit is also used to determine a next target logic circuit in the target combination circuit based on the intermediate parameter data, and transmit the intermediate parametric data to the next target logic circuit for fast operation processing until data after the fast operation processing by the next target logic circuit is a fault characteristic parameter and the fault characteristic parameter is transmitted to the first control unit.

Specifically, since the first control unit runs the main program of the relay protection, during operation, a target logic circuit that requires a characteristic logic operation is determined in the target combination circuit already combined, and the electrical signal of the to-be-protected electrical device is transmitted to the target logic circuit for a fast operation processing to obtain the intermediate parametric data, and the intermediate parameter data is transmitted to the first control unit. The first control unit determines the next target logic circuit based on the intermediate parameter data, and transmits the intermediate parameter data to the next target logic circuit; another logic operation is performed, the intermediate parameter data of the next target logic circuit is obtained, and it is determined whether the intermediate parameter data is a fault characteristic parameter. If yes, proceed to the next step; if not, the intermediate parameter data of the next target logic circuit is taken as a current target intermediate parameter data, and a next target logic circuit is redetermined to obtain intermediate parameter data until the data after fast operation processing by the next target logic circuit is a fault characteristic parameter, and the fault characteristic parameter is transmitted to the first control unit. Exemplarily, in the target combination circuit already combined, a target logic circuit that requires SV message parsing logic operation is determined, and the electrical signal of the top-be-protected electrical device is transferred to the target logic circuit for SV message parsing fast operation processing to obtain the intermediate parameter data, and the intermediate parameter data is transferred to the first control unit. The first control unit determines a next target logic circuit based on the intermediate parameter data, which may be a filtering logic operation circuit. The intermediate parameter data is transmitted to the filtering logic operation circuit for filtering logic operation to obtain intermediate parameter data of the next target logic circuit, and it is determined whether the intermediate parameter data is a fault characteristic parameter. If yes, proceeds to the next step. If not, the intermediate parameter data of the next target logic circuit is taken as current target intermediate parameter data, and a next target logic circuit is redetermined, which may be a synchronization logic operation circuit, and the intermediate parameter data may be obtained until the data after synchronization fast operation by the next target logic circuit is a fault characteristic parameter, then the fault characteristic parameter is transmitted to the first control unit.

In the embodiment, the first control unit determines the target logic circuit in the target combination circuit and transmits the electrical signal of the to-be-protected electrical device to the target logic circuit for fast operation processing to obtain the intermediate parameter data; the first control unit determines the next target logic circuit in the target combination circuit based on the intermediate parameter data and transmits the intermediate parameter data to the next target logic circuit for fast operation processing until the data after the fast operation processing by the next target logic circuit is the fault characteristic parameter, and the fault characteristic parameter is transmitted to the first control unit, which can perform relay protection under the joint action of the software program and the hardware circuit. Compared with the hardware logic circuit, the instructions of the software program are all executed serially, and only limited interrupt resources can be invoked when dealing with unexpected events, while the hardware logic circuit is characterized by the fact that different logics can be executed in parallel to handle different tasks at the same time, thus improving processing efficiency. When the device accesses a large amount of concurrent real-time data, the advantage of parallelism of the hardware logic circuit is used to break the mode of sequential execution, and more processing tasks may be completed in each clock cycle, obtaining better data processing capability than that of software programs.

The above embodiment illustrates the process of software and hardware cooperation in relay protection device. How to determine a relay protection result is illustrated in an embodiment hereinafter. In an embodiment, the first control unit is used to determine the relay protection result for the to-be-protected electrical device based on a preset electrical parameter of the to-be-protected electrical device and the fault characteristic parameter, and protect the electrical device according to the relay protection result.

Or, the first control unit is used to perform a calculation on the fault characteristic parameter, transmit a calculation result to the target logic circuit in the target combination circuit, determine the relay protection result for the to-be-protected electrical device, and protect the electrical device according to the relay protection result.

The preset electrical parameter may be key data in the relay protection device that is highly related to the protection function, including a protection setting value, a pressure plate, an analog quantity sampling value, protection activation and alarming tags, etc. Some of the above data is dynamically changed and placed in the shared cache.

Specifically, the first control unit may obtain the preset electrical parameter from the shared cache, and when the logic circuit extracts the fault characteristic parameter, the relay protection result of the to-be-protected electrical device may be determined by comparing the preset electrical parameter of the to-be-protected electrical device with the fault characteristic parameter. For example, the preset electrical parameter is the protection setting value, the fault characteristic parameter and the protection setting value are compared; if the fault characteristic parameter is larger than the protection setting value, the relay protection result is fault, otherwise, the relay protection result is normal. In the case that the relay protection result is fault, an external relay is controlled to perform the relay protection.

When a logic circuit capable of logical judgment is provided in the target logic circuit, the first control unit may first perform certain calculation and processing on the fault characteristic parameter, and transmit the calculation result to the target logic circuit having logical judgment function in the target combination circuit, the relay protection result of the to-be-protected electrical device may be determined, and the electrical device may be protected according to the relay protection result.

In the embodiment, the first control unit determines the relay protection result of the to-be-protected electrical device based on the preset electrical parameter of the to-be-protected electrical device and the fault characteristic parameter, and according to the relay protection result, protects the electrical device; or, the first control unit calculates the fault characteristic parameter and transfers the calculated result to the target logic circuit in the target combination circuit, determines the relay protection result of the to-be-protected electrical device and, based on the relay protection result, protects the electrical equipment. It is possible to realize that the first control unit judges the relay protection result by using a software program, or to realize that the logic circuit with logic judgment capability judges the relay protection result, further realizing the soft and hard synergy of the relay protection device, and thus improving the detection efficiency.

Technical features of the above embodiments can be carried out in any combination. To make the description concise, not all possible combinations of the technical features of the above embodiments are described, however, any combination of these technical features, in case of no conflict, should be considered falling within the scope of the present specification.

The above described embodiments are merely several embodiments of the present application, and their descriptions are relatively specific and detailed, but they should not be construed as a limitation of the scope of the present application. It should be noted that for a person of ordinary skill in the art, a number of variations and improvements can be made without departing from the conception of the present application, all of which fall within the scope of protection of the present application. Therefore, the scope of protection of the present application shall confirm to the attached claims.

The invention claimed is:

1. A chip-level software and hardware cooperative relay protection device, comprising a control chip, wherein a first control unit, a second control unit, and a plurality of logic circuits are integrated on the control chip; the first control unit and the second control unit are multi-core structures;

the first control unit is configured to: determine a target logic circuit in a target combination circuit and transmit an electrical signal of a to-be-protected electrical device to the target logic circuit for a millisecond-level fast operation processing to obtain intermediate parameter data; the target combination circuit is combined by the first control unit based on an identification of the target logic circuit comprised in logic circuit configuration information;

the first control unit is configured to: determine a next target logic circuit in the target combination circuit based on the intermediate parameter data, and transmit the intermediate parametric data to the next target logic circuit for millisecond-level fast operation processing until data after the fast operation processing by the next target logic circuit is a fault characteristic parameter and the fault characteristic parameter is transmitted to the first control unit;

the first control unit is configured to: perform a millisecond-level real-time protection logical judgement based on the fault characteristic parameter of the to-be-protected electrical device, obtain a relay protection result for the to-be-protected electrical device, and control an external relay to protect the to-be-protected electrical device based on the relay protection result; and the second control unit is configured to, when the first control unit protects the to-be-protected electrical device, perform a second-level quasi-real-time management communication function processing on operation data generated by the first control unit and the logic circuits.

2. The chip-level software and hardware cooperative relay protection device according to claim 1, wherein the second control unit is configured to synchronously perform a plurality of data processing tasks with second-level computing power, and the plurality of data processing tasks comprise at least two of: data recording, data displaying, data printing, data sending, and other management communication functions.

3. The chip-level software and hardware cooperative relay protection device according to claim 1, wherein the first control unit is configured to, when the relay protection result for the to-be-protected electrical device indicates a fault of the to-be-protected device, control the external relay to clear the fault to achieve relay protection.

4. The chip-level software and hardware cooperative relay protection device according to claim 1, wherein every two among the logic circuits, the first control unit and the second control unit are connected to each other via a high-speed data channel.

5. The chip-level software and hardware cooperative relay protection device according to claim 1, further comprising a reset and monitoring hardware;

wherein the reset and monitoring hardware is configured to monitor an operation status of the first control unit and perform a reset process on the first control unit when the operation status of the first control unit is abnormal.

6. The chip-level software and hardware cooperative relay protection device according to claim 1, wherein the second control unit further comprises a first timing register, the logic circuit further comprises a second timing register, and the chip-level software and hardware cooperative relay protection device further comprises a secondary reset hardware;

wherein the first control unit is configured to:
monitor a count value of the first timing register and a count value of the second timing register; and
control the secondary reset hardware to reset the second control unit when the count value of the first timing register stops updating, and/or control the secondary reset hardware to reset the logic circuit when the count value of the second timing register stops updating.

7. The chip-level software and hardware cooperative relay protection device according to claim 1, wherein
the second control unit is further configured to: obtain logic circuit configuration information, the logic circuit configuration information comprising an identification of a target logic circuit, and store the logic circuit configuration information in a shared cache of the control chip; wherein the target logic circuit comprises at least two circuits of the plurality of logic circuits;
the first control unit is further configured to: obtain the logic circuit configuration information from the shared cache, and combine a target combination circuit according to the identification of the target logic circuit; wherein the target combination circuit comprises the target logic circuit;
the first control unit is configured to: transmit the electrical signal of the to-be-protected electrical device to the target combination circuit, enable the target combination circuit to obtain the fault characteristic parameter of the to-be-protected electrical device based on the electrical signal and transmit the fault characteristic parameter to the first control unit.

8. The chip-level software and hardware cooperative relay protection device according to claim 1, wherein the logic circuits in the target combination circuit process the electrical signal of the to-be-protected electrical device in parallel.

9. The chip-level software and hardware cooperative relay protection device according to claim 1, wherein
the first control unit is configured to determine the relay protection result for the to-be-protected electrical device based on a preset electrical parameter of the to-be-protected electrical device and the fault characteristic parameter, and protect the electrical device according to the relay protection result, wherein the preset electrical parameter is key data in the relay protection device that is highly related to protection function, comprising at least one of a protection setting value, a pressure plate, an analog quantity sampling value, or protection activation and alarming tags; or
the first control unit is configured to perform a calculation on the fault characteristic parameter, transmit a calculation result to the target logic circuit in the target combination circuit, determine the relay protection result for the to-be-protected electrical device, and protect the electrical device according to the relay protection result.

10. The chip-level software and hardware cooperative relay protection device according to claim 1, wherein the first control unit and the second control unit run different systems.

* * * * *